United States Patent Office 3,132,070
Patented May 5, 1964

3,132,070
METHOD OF CONTROLLING FUNGUS BY MEANS OF ORGANOTIN COMPOUNDS
George E. Lukes, Irvington, N.Y., and Ashley H. Freiberg, Santa Clara, Calif., assignors to Stauffer Chemical Company, New York, N.Y., a corporation of Delaware
No Drawing. Filed Mar. 16, 1962, Ser. No. 180,323
5 Claims. (Cl. 167—22)

This invention relates to the control of fungus growth, particularly the varieties which infect food plants, by means of certain organotin sulfides. The invention also pertains to fungicidal compositions containing as their active component at least one of the aforenamed organotin sulfides and to methods of applying and using such compositions.

We have found that certain organotin derivatives of sulfur are unusually effective in controlling the growth of various harmful and noxious fungi of which typical representatives include rust, mildew and blight. These microorganisms are injurious to important and valuable commercial food crops such as wheat, corn, tomatoes and the like.

Compounds which have proved especially efficacious for the above described purpose are the organotin sulfides of the following formula:

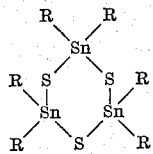

wherein R represents a lower non-branched alkyl radical, e.g. methyl, ethyl, n-propyl, n-butyl, etc. An important feature of these toxicants resides in their low phytotoxicity when employed at concentration levels sufficient to prevent or exterminate the fungus growth. That this should be the case is most singular and unexpected in view of the extreme degree of phytotoxicity exhibited by their isomeric counterparts. For instance, n-dibutyltin sulfide when applied as a protectant spray at a rate of 1000 p.p.m. (parts per million) to bean plants was 100% effective in preventing the growth of bean rust. At the same time, the host plant tolerated the dosage without incurring damaging phytotoxic side effects. On the other hand, diisobutyltin sulfide when used in place of the straight chain isomer under identical circumstances, produced such a high degree of phytotoxicity that the host plants were virtually destroyed.

It might be predicted that the fungicidal activity of the lower n-dialkyltin sulfides would also be displayed by their closely constructed analogs. Such, however, is not the case. Thus, we have prepared the oxygen analog, n-dibutyltin oxide, and tested it against various fungi and related microorganisms. In general, the oxide demonstrated only feeble biocidal activity toward the more susceptible microorganisms and showed no significant activity in diminishing the growths of resistant strains. For example, n-dibutyltin oxide when applied at a typical dosage of 500 p.p.m. did not significantly retard the growth of mildew on beans plants. Yet, under identical conditions, n-dibutyltin sulfide was 100% effective.

Although the lower homoogs of the herein contemplated toxicants, i.e. those having less than four carbon atoms, are also biologically active, they are not as effective as the preferred n-dibutyltin sulfide. This can be demonstrated by considering test data in which the activity of a typical lower homolog is compared with that of n-dibutyltin sulfide. Thus, dimethyltin sulfide when applied in the form of a protectant spray at the rate of 1000 p.p.m. was 90% effective against bean rust. However, complete protection was achieved using n-dibutyltin sulfide. Similar results were obtained when the infecting fungus was one of the type which forms mildew on the host plant. Other microorganisms which can be controlled by n-dibutyltin sulfide include *Aspergillus niger*, *Penicillium sp.* and *Escherichia coli*, the concentration of the toxicant being in the neighborhood of less than 50 p.p.m.

In the table below are summarized the results of using n-dibutyltin sulfide to treat potatoes infected with late blight. The data clearly establishes the protective action of the toxicant imparted to the potato plants over a twenty-day period as compared to the untreated plants.

TABLE

Percent of Foliar Damage by Late Potato Blight at Date of Reading

| Compound | 12-5-61 | 12-11-61 | 12-16-61 | 12-20-61 | 12-25-61 |
|---|---|---|---|---|---|
| n-Dibutyltin sulfide | 0.0 | 0.0 | 0.3 | 3.0 | 13.3 |
| Blank | 5.3 | 26.7 | 43.3 | 76.7 | 80.0 |

The lower straight chain dialkyltin sulfides, the fungicidal use of which is contemplated herein, are in some instances known chemical compounds and are disclosed in the technical literature. In general, they are prepared by reacting the dialkyltin chloride with sodium sulfide. Typically, an acetone slurry of 0.5 mol of n-dibutyltin chloride is added to a 50% aqueous solution comprising 0.5 mol of sodium sulfide. The mixture is refluxed for four hours after which the solvent is removed leaving a residue of n-dibutyltin sulfide in the form of a heavy yellow liquid.

Biocidal compositions embodying the toxicants of the invention can be prepared in numerous ways which are known to the art. For example, spray formulations can be prepared by dissolving the lower n-dialkyltin sulfide in a suitable organic solvent such as xylene and dispersing the solution in water in the presence of a surface active wetting or emulsifying agent. If desired, concentrated solutions of the n-dialkyltin sulfide in solvents can be prepared embodying a wetting agent in amounts sufficient to effect emulsification of the toxicant on dilution with water.

Compositions may also be formulated in the form of a wettable powder. The n-dialkyltin sulfide can be mixed with a small amount of surface active agent and a finely divided solid carrier as exemplified by talc, clay, e.g. attapulgite, kaolin, fuller's earth, wood flour or other similarly constructed solid carriers of the types commonly employed for the purpose of formulating biocidal powder compositions.

Suitable surface active materials include the anionic or cationic varieties and encompass the alkali metal and ammonium salts of long chain aliphatic carboxylic acids, sulfonates of the aromatic or long chain aliphatic hydrocarbons as typified by the sodium alkyl sulfates and sulfonates, alkyl aryl sulfonate salts, sulfonates of gylcerides and their fatty acids.

In general, the aforedescribed wettable powder compositions contain about 1% to about 5% of a dispersing agent, about 25% to about 90% of the toxicant and the remainder of the mixture substantially consists of the inert solid diluent and carrier. The aqueous dispersions of the wettable powder which are applied to plants commonly contain about ⅛ to 1 pound of the toxicant for every 100 grams of water.

It will be manifest to those skilled in the art that various changes and modifications may be made in the invention without departing from the scope or spirit thereof and that the said invention is deemed to be limited only by the scope of the appended claims.

We claim:

1. The method of controlling fungus growth on foliage which comprises treating the foliage with a n-dialkyltin sulfide of the formula:

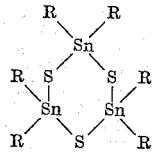

wherein R represents a non-branched alkyl radical of from 1 to 4 carbon atoms.

2. The method of controlling fungus growth on foliage which comprises treating the foliage with a n-dibutyltin sulfide of the formula:

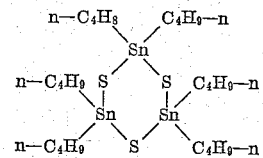

3. The method according to claim 2 wherein the foliage is treated with the n-dibutyltin sulfide in a dust carrier.

4. The method according to claim 2 wherein the foliage is treated with the n-dibutyltin sulfide dissolved in a normally liquid organic solvent.

5. The method according to claim 2 wherein the foliage is treated with a composition comprising as the active component thereof the n-dibutyltin sulfide dispersed in water.

References Cited in the file of this patent

UNITED STATES PATENTS

| | | |
|---|---|---|
| 2,746,946 | Weinberg et al. | May 22, 1956 |
| 2,779,703 | Crouch et al. | Jan. 29, 1957 |
| 2,858,325 | Weinberg et al. | Oct. 28, 1958 |

UNITED STATES PATENT OFFICE
CERTIFICATE OF CORRECTION

Patent No. 3,132,070  May 5, 1964

George E. Lukes et al.

It is hereby certified that error appears in the above numbered patent requiring correction and that the said Letters Patent should read as corrected below.

Column 1, line 65, for "homoogs" read -- homologs --; column 4, lines 3 to 8, for the extreme upper left-hand portion of the formula reading $$n-C_4H_8 \diagdown \qquad \text{read} \qquad n-C_4H_9 \diagdown$$

Signed and sealed this 18th day of August 1964.

(SEAL)
Attest:

ERNEST W. SWIDER
Attesting Officer

EDWARD J. BRENNER
Commissioner of Patents